United States Patent
Pop-Lazarov et al.

(10) Patent No.: US 8,082,241 B1
(45) Date of Patent: Dec. 20, 2011

(54) SYSTEM AND METHOD FOR CITATION PROCESSING, PRESENTATION AND TRANSPORT

(75) Inventors: Eftim L. Pop-Lazarov, Wilmington, DE (US); Stephen J. Rieger, Carlsbad, CA (US); David M. Pedrick, Barrington, NJ (US); Sandro Cifelli, Blackwood, NJ (US)

(73) Assignee: Thomson Reuters (Scientific) Inc., Philadelphia, PA (US)

( * ) Notice: Subject to any disclaimer, the term of this patent is extended or adjusted under 35 U.S.C. 154(b) by 1656 days.

(21) Appl. No.: 10/166,058

(22) Filed: Jun. 10, 2002

(51) Int. Cl.
*G06F 7/00* (2006.01)
*G06F 17/30* (2006.01)

(52) U.S. Cl. ........................ 707/708; 707/771
(58) Field of Classification Search ............... 707/1–4, 707/708; 345/858
See application file for complete search history.

(56) References Cited

U.S. PATENT DOCUMENTS

| | | | |
|---|---|---|---|
| 5,649,222 A | | 7/1997 | Mogilevsky |
| 6,012,075 A | * | 1/2000 | Fein et al. .................... 715/540 |
| 6,289,342 B1 | * | 9/2001 | Lawrence et al. .................... 1/1 |
| 6,356,287 B1 | * | 3/2002 | Ruberry et al. ............... 715/864 |
| 6,728,725 B2 | * | 4/2004 | Garfield et al. ............... 707/102 |
| 7,028,259 B1 | * | 4/2006 | Jacobson ...................... 715/236 |
| 2002/0156760 A1 | * | 10/2002 | Lawrence et al. ................. 707/1 |
| 2003/0028503 A1 | * | 2/2003 | Giuffrida et al. ................. 707/1 |
| 2006/0248440 A1 | * | 11/2006 | Rhoads et al. ................. 715/500 |
| 2008/0282139 A1 | * | 11/2008 | Davis ............................ 715/205 |

OTHER PUBLICATIONS

"ProCite 5 for Windows Press Release", May 15, 2002, http://www.procite.com/pr-pc5.asp, pp. 1-3.
"GoodNews for All Macintosh Users for Reference Manager and ProCite: ProCite for the Macintosh, version 4", May 15, 2002, http://hsc.virginia.edu/hs-library/newsletter/1998/Oct/tools.html, p. 1 of 1.
"ProCite 5.0 Information Toolbox to Manager References", May 15, 2002, http://www.gtpcc.org/gtpcc/procite.htm, pp. 1-4.
Satya-Murti, Saty, MD, "EndNote v. 4 Reference Manager 9.0 ProCite 5.0", Jama Books, Journals, New Media, vol. 284 No. 12, Sep. 27, 2000, http://jama.ama-assn.org/issues/v284n12/ffull/jbk0927-4.html, pp. 1-4.
University of Waterloo, "Electronic Workplace: Personal Bibliographic and Reference Management Software", May 15, 2002, http://ist.uwaterloo.ca/ew/biblio/icite.html, pp. 1-4.

* cited by examiner

*Primary Examiner* — Hung T Vy
*Assistant Examiner* — Binh V Ho
(74) *Attorney, Agent, or Firm* — Valenti Hanley & Robinson, PLLC; Kevin T. Duncan (57) ABSTRACT

The present invention comprises a system and method for automatically processing one or more citations contained within a document while the document is presented by a document rendering application. The method of the present invention comprises scanning the document to identify an unformatted citation and parsing the unformatted citation to determine one or more citation terms. One or more citation libraries are queried to find citations comprising the one or more citation terms. A citation falling within the scope of the query is selected and inserted into the document.

18 Claims, 9 Drawing Sheets

SYSTEM AND METHOD FOR CITATION PROCESSING, PRESENTATION AND TRANSPORT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

The invention disclosed herein relates generally to document processing systems. More particularly, the present invention relates to systems and methods for dynamically processing citation data for presentation within a document rendering application, such as a word processor.

Document processing systems and methods are well known to the art, most notably dynamic spell checking systems. One example of a document processing system for dynamic spell checking is U.S. Pat. No. 5,649,222 ("the '222 patent") by to Mogilevsky. The disclosure of the '222 patent discusses a method for checking spelling in a word processor wherein spell checking is conduced in conjunction with the editing process. The spell checker maintains a table of spelling status data, which includes codes to identify checked, unchecked or edited ranges of characters. During idle periods, the spelling status data is analyzed to determine text requiring spell checking and spelling errors are highlighted during the editing process. The spelling status data is maintained with the document so that spell checked portions of the document do not need to be re-checked.

Similar systems and methods are also known to the art wherein the grammar of an electronic document is verified in a background process. For example, according to U.S. Pat. No. 6,012,075 ("the '075 patent") to Fein, at al., while a word processor is in edit mode, i.e., the user is entering data or commands, idle periods are identified by the word processing software or a component thereof. During a given idle period, a sentence is extracted from the document to determine whether the sentence is properly constructed. If the sentence is not properly constructed, an error is indicated to the user in the context of the electronic document. This process is repeated for each sentence in the electronic document until either the entire electronic document is proofed or the idle period ends. A context menu may be displayed to present corrections for the error.

Systems and methods such as those known to the art, however, do not teach how to apply the state of the art to systems and methods for automatically processing literary citations. The process of properly citing references in a document, such as an article for a scholarly journal, is necessarily complex due to the sheer number of potential references for citation. Furthermore, systems and methods directed to problem of automatically processing citations must ensure the accuracy of processed citations, as well as select a citation from one or more acceptable citations based on a limited set of citation data. Thus, systems and methods are required for automatically processing citations within documents based on citation data provided by an author.

BRIEF SUMMARY OF THE INVENTION

The present invention is directed to systems and methods for automatically processing one or more citations contained within a document while the document is presented by a document rendering application. The method of the present invention comprises scanning the document to identify an unformatted citation and parsing the unformatted citation to determine one or more citation terms. One or more citation libraries are queried to find citations comprising the one or more citation terms. A citation falling within the scope of the query is selected, properly formatted and inserted into the document.

In order to automate the processing of citations contained within a document, scanning is executed periodically. According to one embodiment of the invention, scanning is executed when an idle state is identified. The method may comprise embedding into the document a traveling library comprising citation data that forms the citation inserted into the document. Also, links to citation data may be inserted that forms the citation falling within the scope of the query.

The present invention also contemplates a system for automatically processing one or more citations contained within a document while the document is presented by a document rendering application. The system of the present invention comprises citation editor software to identify an unformatted citation within the document. The citation editor software works in conjunction with a citation application to receive the unformatted citation, retrieve a citation that matches the unformatted citation from a citation library, and pass the citation back to the citation editor software for formatting and insertion into the document. The citation editor software may identify the unformatted citation on a periodic basis, such as when an idle state is identified.

The system may make use of a shared library to convert data from a first format to a second format. Accordingly, the first format may be a native format of the citation editor software and the second format a native format of the citation application. A traveling library may be employed that contains citation data that forms the citation, which is embedded into the document. According to embodiments of the invention, links are inserted into the document linking to citation data that forms the citation, which may comprise a drawing or chart.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE PREFERRED EMBODIMENTS

Figure 1:
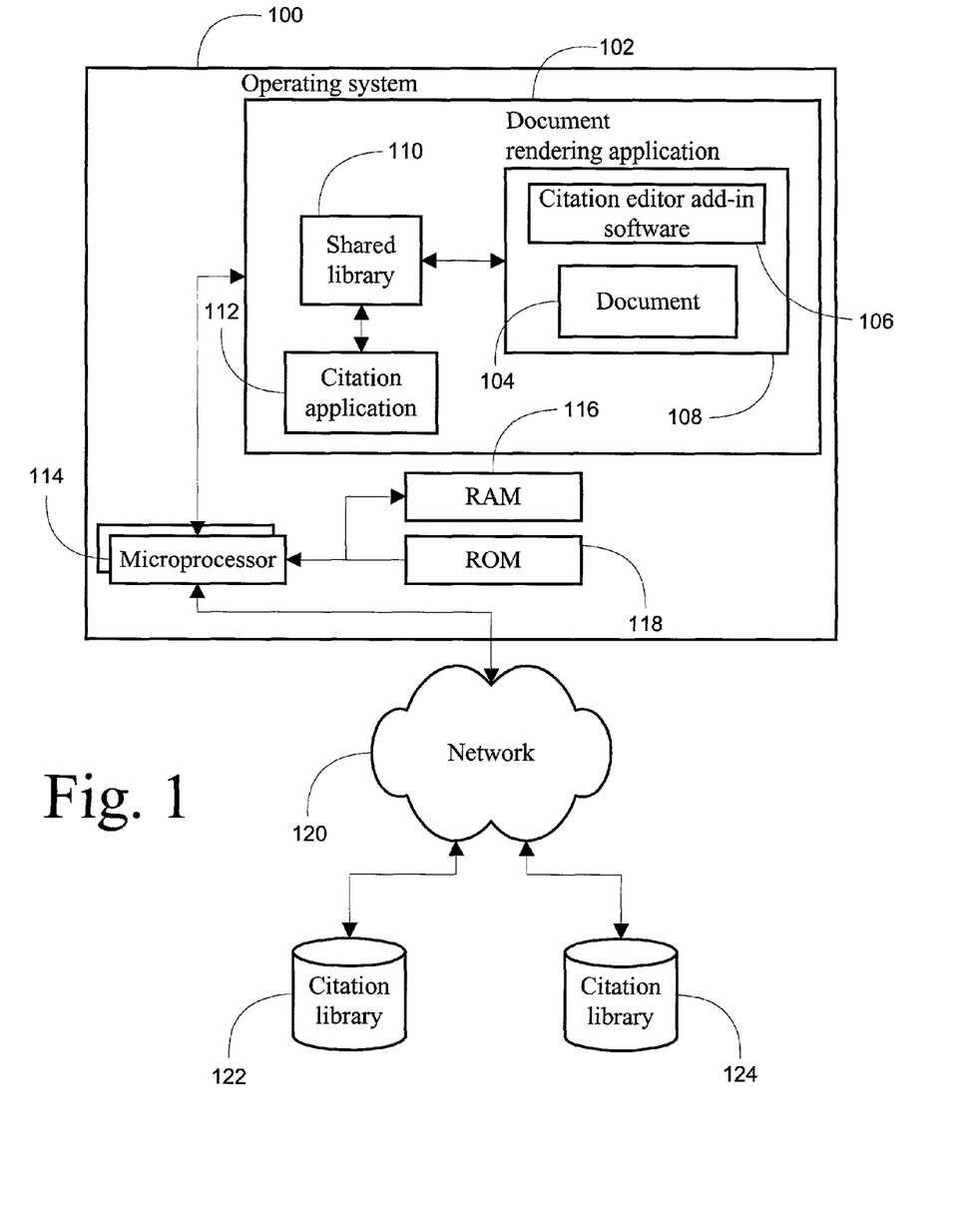
FIG. 1 is a block diagram presenting a configuration of hardware and software components according to one embodiment of the present invention.

With reference to FIGS. 1 through 8, various embodiments of the invention are presented. FIG. 1 is a block diagram presenting one embodiment of a configuration of the hardware and software components comprising the present invention. A general purpose operating system 102 is provided as a framework for storing data and executing applications, as well as policing the flow of input and output. Exemplary general purpose operating systems are MacOS from Apple Computer, Inc., Windows from Microsoft Corp., and various distributions of the Linux and UNIX operating systems.

A computer 100 that comprises one or more microprocessors 114 executes the operating system 102. When the computer initially boots up, instructions are provided from Read-Only Memory (ROM) 118 in order to provide a basic set of input/output functionality to the microprocessor 114. The set of instructions contained in ROM 118 is used by the microprocessor 114 to load the operating system 102, which is typically maintained on a persistent storage device such as a hard drive (not pictured). The microprocessor 114 uses Random Access Memory 116 in order to maintain transient storage space that is used by the operating system 102 in addition to other executing application programs, e.g., a document rendering application 108.

An author using the computer 100 executes a document rendering application 108. According to one embodiment of the invention, the document rendering application 108 is a word processor used to draft text and similar mixed media documents, such as MICROSOFT WORD™. Alternatively, the document rendering application may comprise a HTML text editor, such as MICROSOFT FRONTPAGE™ or BBEDIT™ by Bare Bones Software, Inc. Indeed, all software systems designed to manipulate and render text data files fall within the scope of the present invention.

Many document rendering applications 108 comprise the capability to expand the functionality of the application through the use of a plug-in or similar architecture. The system of present invention comprises a citation editor add-in 106 that provides citation processing within the context of the document rendering application 108. In Microsoft Word, a programmer may develop an add-in, also referred to as a global template, to provide generic functionality in the Word environment. For example, an add-in may contain common tools for working with documents 104. The author is provided access to functionality of the citation editor add-in 106 by clicking graphical toolbar elements and menu commands that the citation editor add-in offers. Alternatively, the citation editor add-in may be a supplemental program that adds custom commands or custom features to an application. It should be noted that the citation editor add-in, as well as the other components of the present invention, may be embodied as software stored on computer readable media that, when loaded by a computer, instructs the computer to execute the processes described in greater detail herein.

According to one embodiment of the invention, the citation editor add-in 106 is a COM (Component Object Model) object designed to be loaded and run in one or more Microsoft Office applications. COM add-ins are designed to connect to and disconnect from one or more Office applications using an architecture that is shared between the applications. The citation editor add-in 106 may be implemented with any number of programming tools capable of creating DLLs (Dynamic Link Libraries).

The citation editor add-in 106 provides access to multiple functions related to the creation of citations, as well as bibliographies. Exemplary functionality includes the capability to find, edit and insert citations, access to an external citation application, format a bibliography, remove specialized field codes from a document, and prepare a traveling library for export with the document wherein other authors may have access to the citation reference used to build a citation contained within a document 104. The citation editor add-in 106 also provides instant formatting of citations while an author is drafting a document. According to embodiments of the invention the citation may comprise a graphic, such as a drawing or chart that is being cited.

When the document rendering application 108 is executed, the citation editor add-in 106 is loaded. The citation editor add-in 106 implements the menu and toolbar elements, which provide communication to the citation application 112 and the document rendering application 108 as required to implement or execute the command selected by the document author. According to one embodiment, this communication in implemented by way of COM interfaces exposed by the document rendering application 106 and the citation application 112 by way of a shared library 110. Furthermore, the citation editor add-in 106 monitors the document 104 for conditions that require citation processing, e.g., the presence of temporary citations.

The shared library 110 may be loaded by the citation application 112 or by the citation editor add-in 106 when the document rendering application 108 is initially instantiated. The shared library 110 serves as an intermediary between the citation editor add-in 106 and the citation application 112. Essentially, the shared library 110 converts data from an initial format to a format that is native to the citation application 112. For example, where the citation editor add-in 106 is implemented as a COM object, the shared library 110 translates COM data elements into data elements that adhere to the communication protocol or format that is native to the citation application 112, e.g., provides the COM interface.

The shared library 110 offers an interface to the functionality provided by the citation application 112, which is where application logic executed by the citation editor add-in 106 resides. One major function of the citation application 112 is to provide underlying citation data that is used by the citation editor add-in 106 to present properly formatted citations within a document 104. The citation editor add-in 106 periodically scans the document 104, e.g., when an idle state is detected due to the fact the author has stopped entering text or commands. According to one embodiment of the invention, temporary citations are identified and the citation terms contained within the temporary citation are passed to the citation application 112 via the shared library 110. Alternatively, the author may manually indicate temporary citations for processing on a case-by-case basis.

Advantageously, an author may supply pieces of a citation within a document 104 in an unformatted fashion whereby the citation editor add-in 106, in conjunction with the citation application 112, modifies the data to provide a complete formatted citation. The citation editor add-in 106 periodically scans the document 104 to identify temporary citations. According to one embodiment, the citation editor add-in 106 scans the document 104 when an idle period is identified, e.g., when the author pauses in the process of editing or entering commands. The citation editor add-in 106, in conjunction with the citation application 112, replaces the temporary citation with a properly formatted citation. Furthermore, it should be noted that the citation may be used to reference a chart or drawing cited through the use of a temporary citation, which may be scanned and formatted by the present invention.

The process of automatically formatting of citations is also referred to as background or instant formatting. It allows an author to always be working with current formatted citations within a document 104. When an author adds a citation to a document 104, the system and method of the present invention formats the citation in the body of the document 104 and may also append the citation to a bibliography at the end of the document 104. The process may also be triggered when a new citation is entered, or when an existing citation is modified to ensure the citation is correct. According to one embodiment, an instant formatting flag is set within the document metadata to instruct the citation editor add-in 106 whether instant formatting should be executed. When instant formatting is disabled, the author may manually access the citation functionality of the citation application 112 through graphical controls presented by the content editor add-in 106, albeit manually.

When scanning, the citation editor add-in 106 identifies citation delimiters, which as a default are represented by curly braces ("{ }"), although the author may define a custom set of citation delimiters. Within the citation delimiters are a number of citation terms separated by a term delimiter, such as a comma. Accordingly a temporary citation may contain no commas, one comma, two commas, or three or more commas. Semicolons or another suitable delimiter may be used within a set of citation terms to serve as a citation separator so that the search for each citation is executed separately, e.g., {Smith, 1991, Dinosaur; Dolphin}. The citation editor add-in 106 scans the document and identifies citations entered into the document 104 by the author. The terms within the term delimiters are parsed into one or more citation terms and passed to the citation application 112 by way of the shared library 110, which converts data into the native format of the citation application 112.

The citation application 112 analyzes the received terms to identify the presence of term delimiters (commas) and citation delimiters (semicolons). Where commas are utilized to delimit terms, strict resolution is utilized. For example, the citation {Smith Jones, 1998 March, Dinosaur extinction} is resolved as if each of the terms is enclosed by quotation marks, as is well known to those of skill in the art. Alternatively, where one or more terms are supplied, e.g., {Smith Jones 1998 March Dinosaur extinction}, the citation is resolved by supplying a Boolean "AND" between each of the terms and identifying citations comprising all of the terms. The citation application's analysis results in the formulation of a citation query.

The citation application 112 uses the citation query to query one or more citation libraries 122 and 124. The citation libraries 122 and 124 may be accessed over a network 120, which may be a local or wide area network, such as an intranet or the Internet. As is explained in greater detail herein, a local database (not pictured) may be maintained comprising selected citations chosen by the author, obviating the need to access the remote sources 122 and 124. Each citation library 122 and 124 comprises one or more citations for references appearing in one or more journals.

Host data files may be provided indicating the address of remote citation libraries such as university card catalogs, the Library of Congress, specialized databases such as PubMed, PsycINFO, and ERIC from popular providers such as Ovid Technologies, SilverPlatter, and OCLC. Typically the citation library comprises a database manager that accepts the citation query, searches the citations contained within the library 122 and 124, and returns a result set comprising citations falling within the scope of the citation query. The citation query may preferably be submitted simultaneously to a plurality of citation libraries 122 and 124.

The result set is returned to the citation application 112. Where the result set comprises only one citation, e.g., a definitive match was found to the query, the citation that the author wishes to insert into the document 104 is identified. The citation data is passed to the citation editor add-in 106 via the shared library 110 for insertion into the document 104. "Field codes" that references citation data are inserted into the document, which may be stored in local or remote citation libraries maintained by the user or a third party data provider. The field codes are links to underlying citation data that is used as a source for the formatted citation displayed in the document.

In displaying the formatted citation, the format defined through the field codes may be set by author-defined parameters. Various scholarly journals have different constraints regarding the formatting requirement for citations. For example, the Journal of the American Medical Association may require that citations adhere to a first format, while the journal Science may require a wholly different citation format. The system of the present invention may advantageously be supplied with citation format parameters for well known journals and publications. In this manner, an author may ensure that citations within a document adhere to a target publication's citation specifications simply by selecting the publication through an interface whereby the parameters are automatically set. Alternatively, or in combination, the author may override any one or more citation format parameters to set a desired value. Furthermore, functionality is provided whereby an author may change the target publication for a document, causing the software to traverse the document and modify the format of the citations contained therein to adhere to the new target publication's citation specifications.

Another feature offered by the system and method of the present invention is a "traveling library". The author may export a traveling library whereby the field codes are used to embed data regarding the reference into the document. When the document is accessed by a collaborator that does not have access to the same citation libraries 122 and 124, the reference data can be found and the full citation and reference are provided when the file is loaded into a document rendering program, thereby obviating the need to manually locate the citations again using the citation application 112 to recreate the libraries used by their collaborators. Furthermore, where a collaborator uses additional libraries to insert citations within the document, these may be exported and passed back to the original author, who has access to the full set of citation data.

Figure 2:
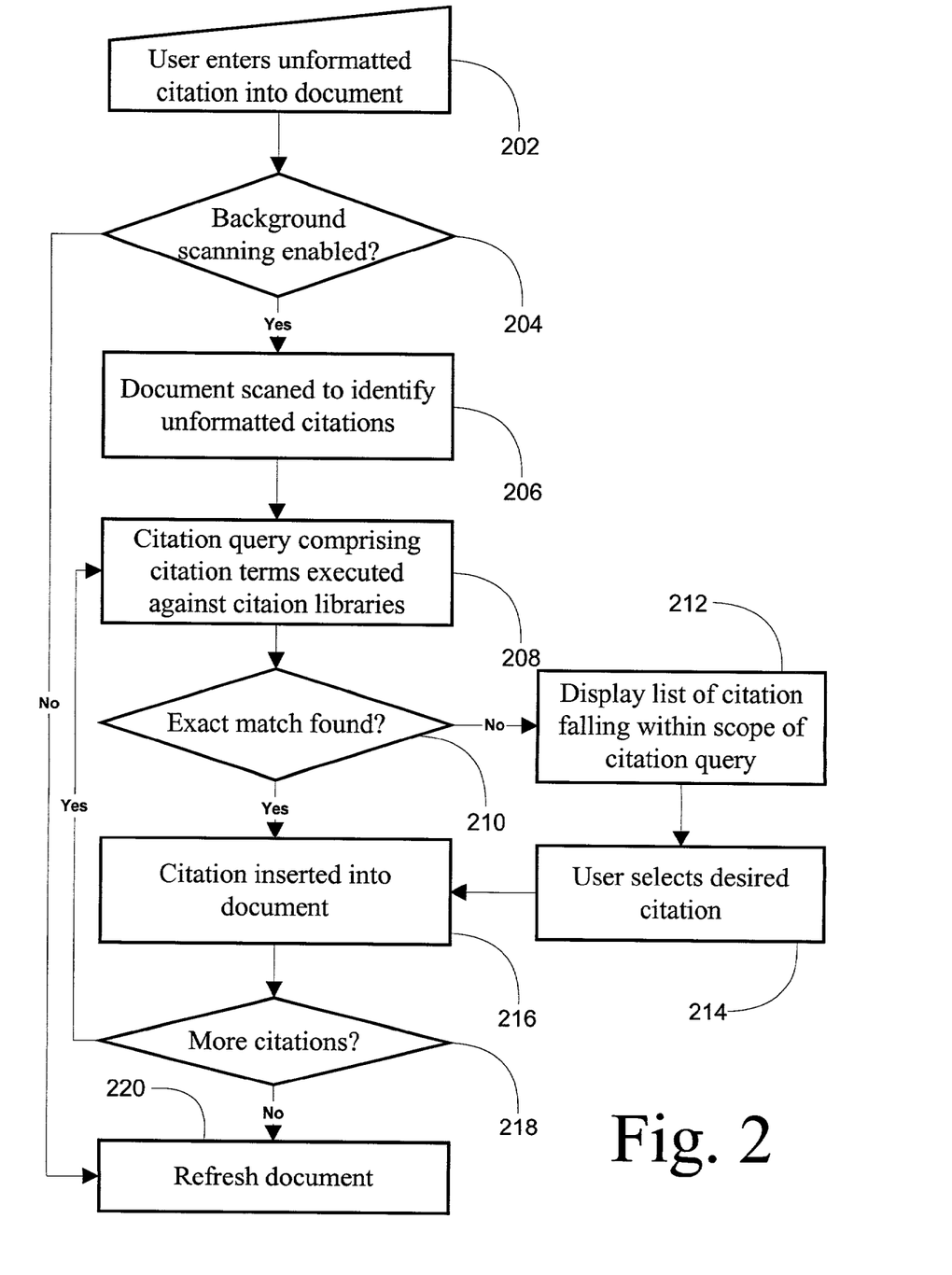
FIG. 2 is a flow diagram presenting a process for automatically formatting citations within a document according to one embodiment of the present invention.

FIG. 2 presents a flow diagram illustrating a method of operating the hardware and software components of FIG. 1 to automatically format citations contained within a document. Using a document rendering application such as a word processor, an author enters an unformatted citation, which is enclosed or encapsulated by a set of citation delimiters, for example, curly braces, step 202. Alternatively, the author may perform edits to a formatted citation requiring the citation to be revalidated or reformatted. A check is performed to determine if background citation scanning is enabled, step 204. The check at step 204 is preferably performed when the document is loaded by the document rendering application. This data may be supplied through the use of a data flag that is set in the document's metadata. Where background scanning is not enabled, program flow is directed to step 220 where the document is refreshed without modifying the text inserted by the user.

Where background citation scanning is enabled, step 204, the document is scanned to identify unformatted citations or citations that have been formatted but subsequently modified, step 206. Identifying citations that have been modified after being formatted may be accomplished in a number of ways. For example, a data file may be maintained where the citation editor add-in compiles a listing of all formatted citations in a given document. Each time the document is scanned, the citation editor add-in compares the formatted citations in the document with the previously formatted citations contained in the data file to determine if any formatted citations have been subsequently modified. Alternatively, the citation editor add-in may set a flag each time a citation is formatted, which is removed if a formatted citation is subsequently modified. When scanning, the citation editor add-in checks the formatting of all previously formatted citations where the flag has been removed.

According to embodiments of the invention, the step of scanning the document is performed when an idle state is identified during the process of entering text or commands. The citation terms supplied by the author is parsed, determining the citation terms and any term delimiters that may be present in the citation, to prepare a citation query that is executed at one or more citation libraries, step 208. The result of the query are returned and analyzed to determine the number of records contained within the result set. A check is performed to determine if an exact match was identified as falling within the scope of the citation query, step 210.

Where an exact match has been found identifying a citation in one of the citation libraries, step 210, field codes identifying the citation are inserted into the document, providing a view to the citation data contained within the sole record in the result set, step 216. Where the result set comprises multiple records, however, a display is presented to the author presenting a listing of the citations that fall within the scope of the citation query, step 212. Using an input device, the author selects the citation that he or she wishes to appear in the document, step 214. Field codes identifying the citation are inserted into the document to provide a view to the citation data contained within the selected record from the result set, step 216.

A check is performed to determine if additional unformatted or modified citations are present in the document, step 218. Where additional citations that require formatting are present in the document, processing returns to step 208 where a citation query comprising citations terms from the outstanding citation is formulated and executed against one or more citation libraries as per steps 210, 212, 214 and 216. Where all the citations are processed, the document is refreshed whereby the field codes present formatted citation data to the author, step 220. According to embodiments of the invention, the process is repeated, step 206, 208, 210, 212, 214, 218 and 218, at regular intervals, e.g., when and idle period is encountered.

Figure 3:
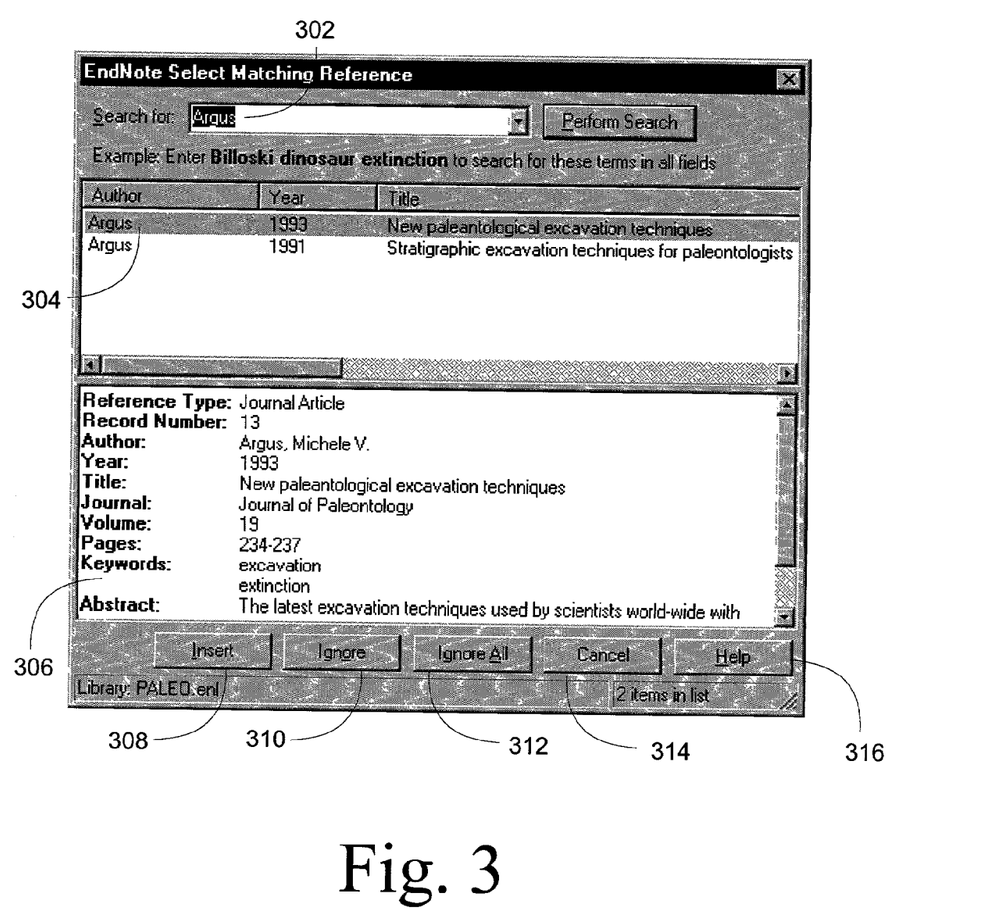
FIG. 3 is a screen diagram presenting an interface for resolving ambiguous citations according to one embodiment of the present invention.

One embodiment of an interface for reviewing citations retrieved from citations libraries as falling within the scope of the citation query through operation of the process presented in FIG. 2 is illustrated in FIG. 3. A search term field 302 is presented wherein citation terms forming the citation query are presented to the author. In this manner, the author is provided with the context of the present query. According to embodiments of the invention, the author may modify the citation terms here and execute the modified citation query against the citation library. Below the search terms is the result set 302, which comprises citation records that fall within the scope of the citation query. Using an input device, the author may select a citation from the result set to review the citation data.

The citation data 306 is presented in a frame occupying the lower half of the interface. The citation data comprises detailed information regarding the reference that forms the basis for the citation including, but not limited to, the reference type, author, year of publication, title of the reference and publication, as well as other miscellaneous information. Advantageously, the citation data may further comprise an abstract providing a brief summary or overview of the substance of the reference. This information is useful to an author in determining if a particular reference is the source of the intended citation.

The ambiguous citation currently being analyzed by the software of the present invention may be acted on by selection of one of the provided interface controls. Using an input device, the author may select on of the citations in the result set 304 for insertion into the document. Selection of the insert control 308 inserts the selected citation into the document. Alternatively, the author may choose to ignore 310 the current citation or ignore all of the unformatted citations 312 contained within the document. Likewise, the citation formatting process may be canceled 314. A control is also provided that allows access to a help system 316 that provides answers to questions an author might have regarding operation of the invention.

As described above, authors may compile selected citation data into a local database imbedded within the document in order to enable others to work with properly formatted citations in the document. The process of exporting a traveling library is presented in FIG. 4. Using an input device, the author selects a control provided by the citation editor add-in that executes the export process, step 402. In response to the author command, the software presents an "export traveling library" dialog box, step 404. Using the interface presented by the dialog box, the author may set preferences regarding the manner in which export is performed.

Figure 4:
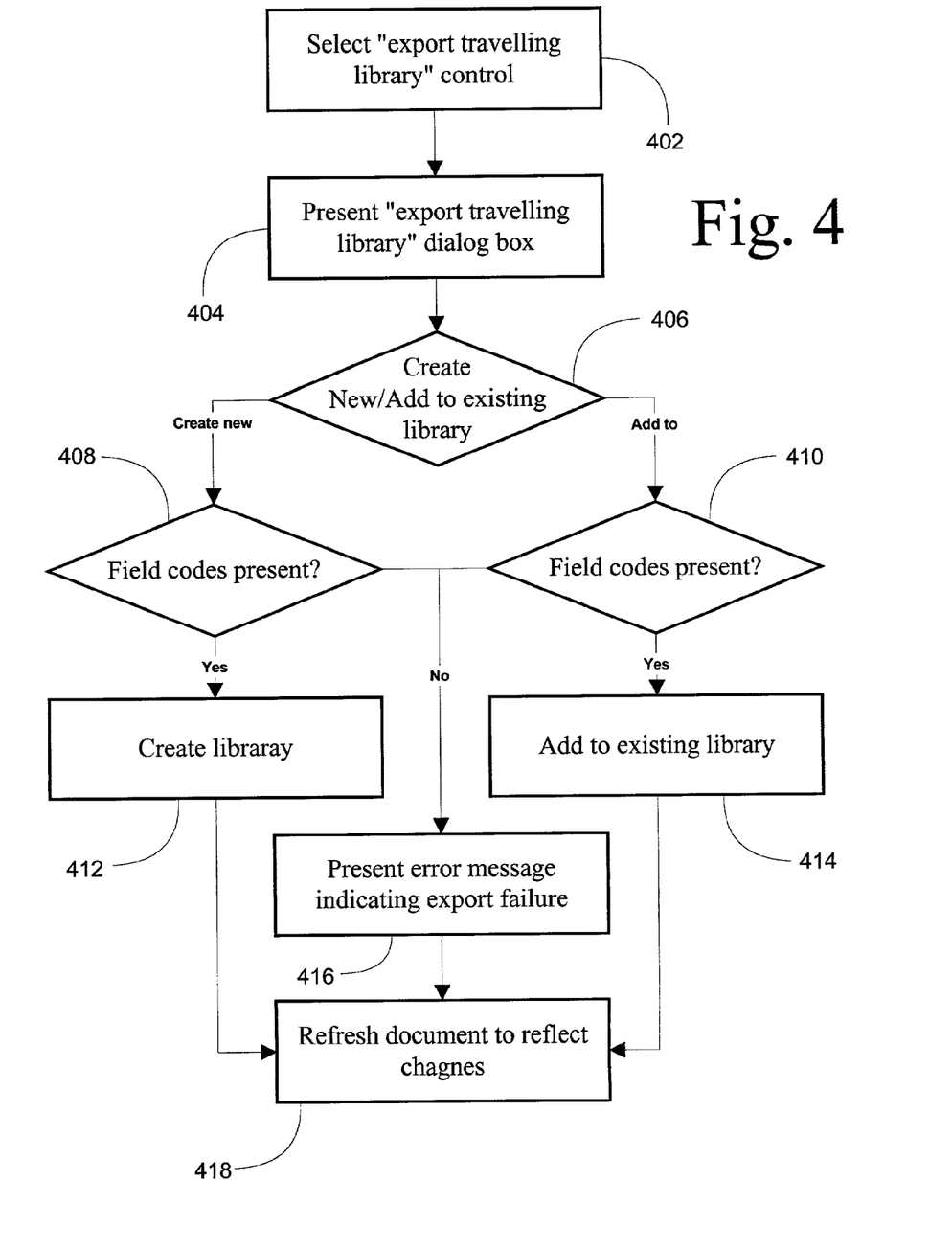
FIG. 4 is a flow diagram presenting a method for exporting a traveling library according to one embodiment of the present invention.

A check is performed to determine whether the author is creating a new citation library in the citation application or adding to an existing library, step 406. Where the author is attempting to export a new citation library in the citation application, step 406, a check is performed to determine if the field codes are still contained within the document, step 408. If the author removes the field codes and replaces them with plain text, the software is unable to invoke export functionality and an error message is presented to the author indicating that the export operation has failed, step 416. Where the software is able to detect the field codes in the document that comprises the citations, a citation library in the citation application comprising the citation data for all the citations contained within the document, step 412.

Where the author is attempting to export citation data to an existing citation library in the citation application, step 406, a check is performed to determine if the field codes are still contained within the document, step 410. If the author removes the field codes and replaces them with plain text, the software is unable to invoke export functionality and an error message is presented to the author indicating that the export operation has failed, step 416. According to one embodiment of the invention, selection of a graphical control provided by the software of the present invention is operative to replace the field codes in the document with the plain text to which the field codes link. Alternatively, the field codes may be manually removed by the author and replaced with the plain text to which the field codes link.

Where the software is able to detect the field codes in the document that comprises the citations, additional selected citation data is added to the citation library in the citation application that was previously embedded into the document, step 414. Regardless of whether the author is creating a new citation library in the citation application or adding to an existing one, program flow is consolidated at step 418 where the software refreshes the document to reflect any changes made by the operation.

Figure 5:
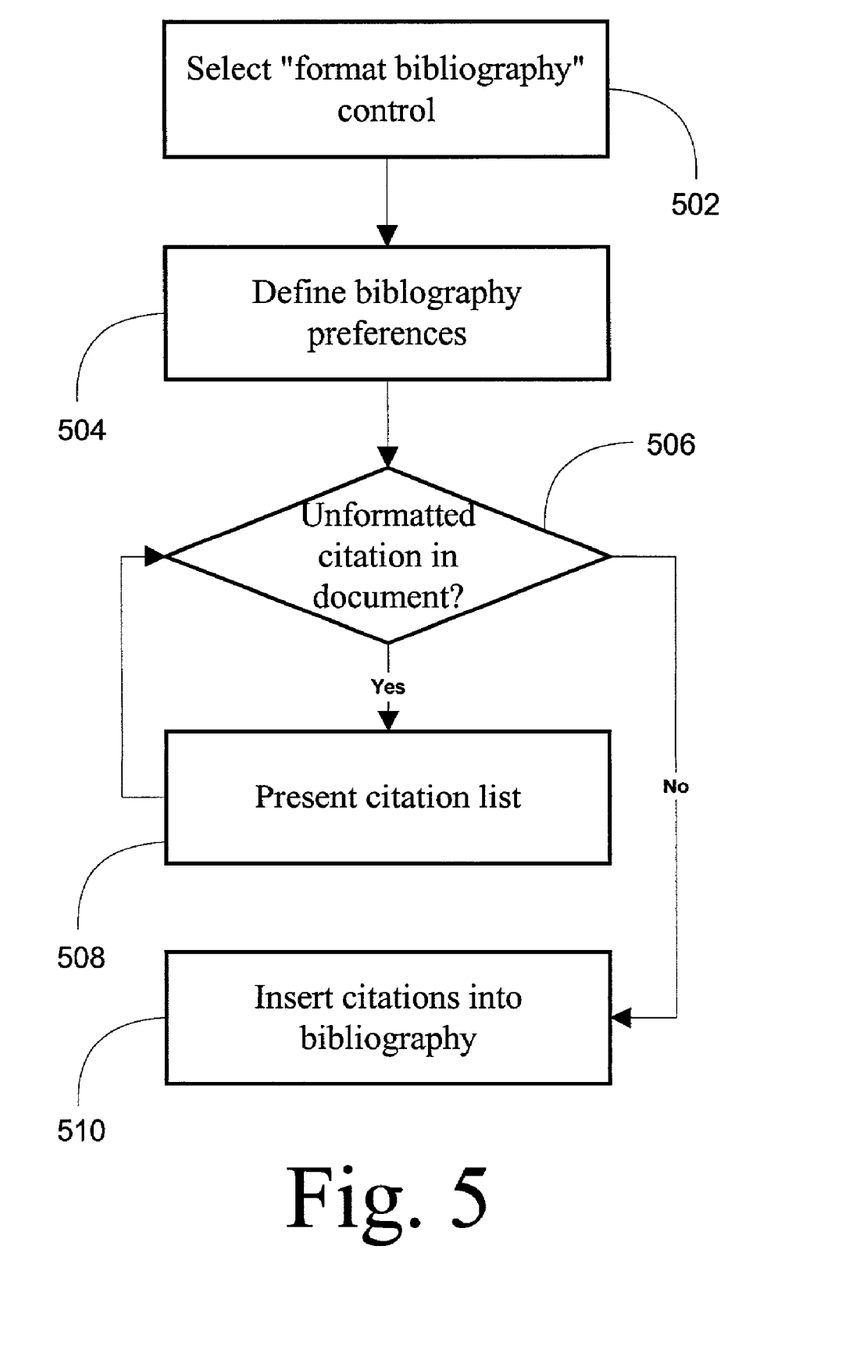
FIG. 5 is a flow diagram presenting a method for generating a bibliography according to one embodiment of the present invention.

The software and methods presented here may also be used to automatically generate a formatted bibliography from citations that are added to a document, as illustrated in FIG. 5. One embodiment of the bibliography generation process begins when the author selects a control presented by the citation editor add-in that executes the bibliography functionality, step 502. The author is provided an opportunity to define one or more preferences regarding the output style that the bibliography will take, step 504. For example, bibliography preferences include, but are not limited to, font style, size, indentations, starting number for the bibliography, etc. Alternatively, bibliography preferences are set before hand by the author and the software simply reads the defined preferences from a data file at step 504.

The software scans the document to determine if citations exist that are awaiting formatting, step 506. Where unformatted citations are present in a document, a citation list is presented to the author, step 508. Using an input device, the author selects the appropriate reference that is associated with the citation supplied by the user. Program flow returns to step 506 where another check is performed for unformatted citations. That process is repeated for all unformatted citations. Alternatively, a process analogous to steps 208, 210, 212, 214 and 216 presented in FIG. 2 are executed for each of the unformatted citations contained within the document in place of the process of step 508. All of the citations in the document are properly formatted and the software inserts the citations into a bibliography, step 510. It should be clear to one skilled in the art that this process may easily be modified to provide for dynamic updating of the bibliography as new citations are supplied or existing citations are editing, which is considered within the scope of the present invention.

Figure 6:
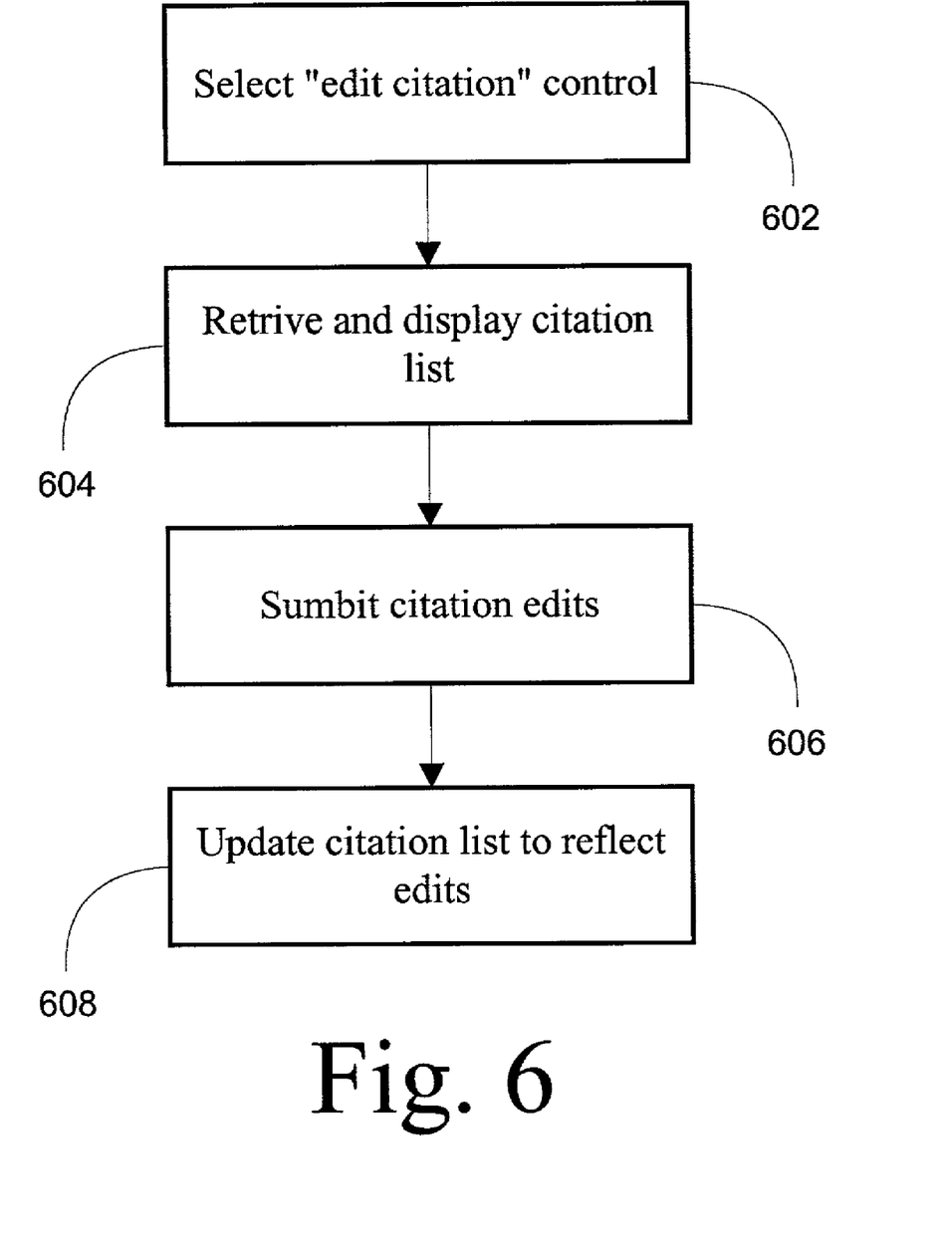
FIG. 6 is a flow diagram presenting a method for editing a citation according to one embodiment of the present invention.

Additionally, an author may edit selected citations that have previously been inserted into a document and formatted, as presented by the method of FIG. 6. An author is provided with graphical controls by the citation editor that supply assistance with the citation editing process, which is selected by the author to being the editing process, step 602. The citation editor add-in transmits a citation edit request to the citation application, which is translated into the native format of the citation application by the shared library. In response to the request, the citation application prepares a listing of all citations contained within the document for presentation to the author by the citation add-in, step 604.

Using an input device, the author may supply changes to one or more of the citations in the document. According to one embodiment of the invention, an interface similar to that presented in FIG. 3 is supplied whereby the author is presented with all references that matched the previously supplied citation terms and given an opportunity to modify the citation terms associated with one or more selected citations. Regardless of the method used to receive citation edits, the edits are submitted by way of the shared library to the citation application for recordation, step 606, which may also include modifying the citation list and field codes in the document to reflect the edits supplied by the author, step 608.

Figure 7:
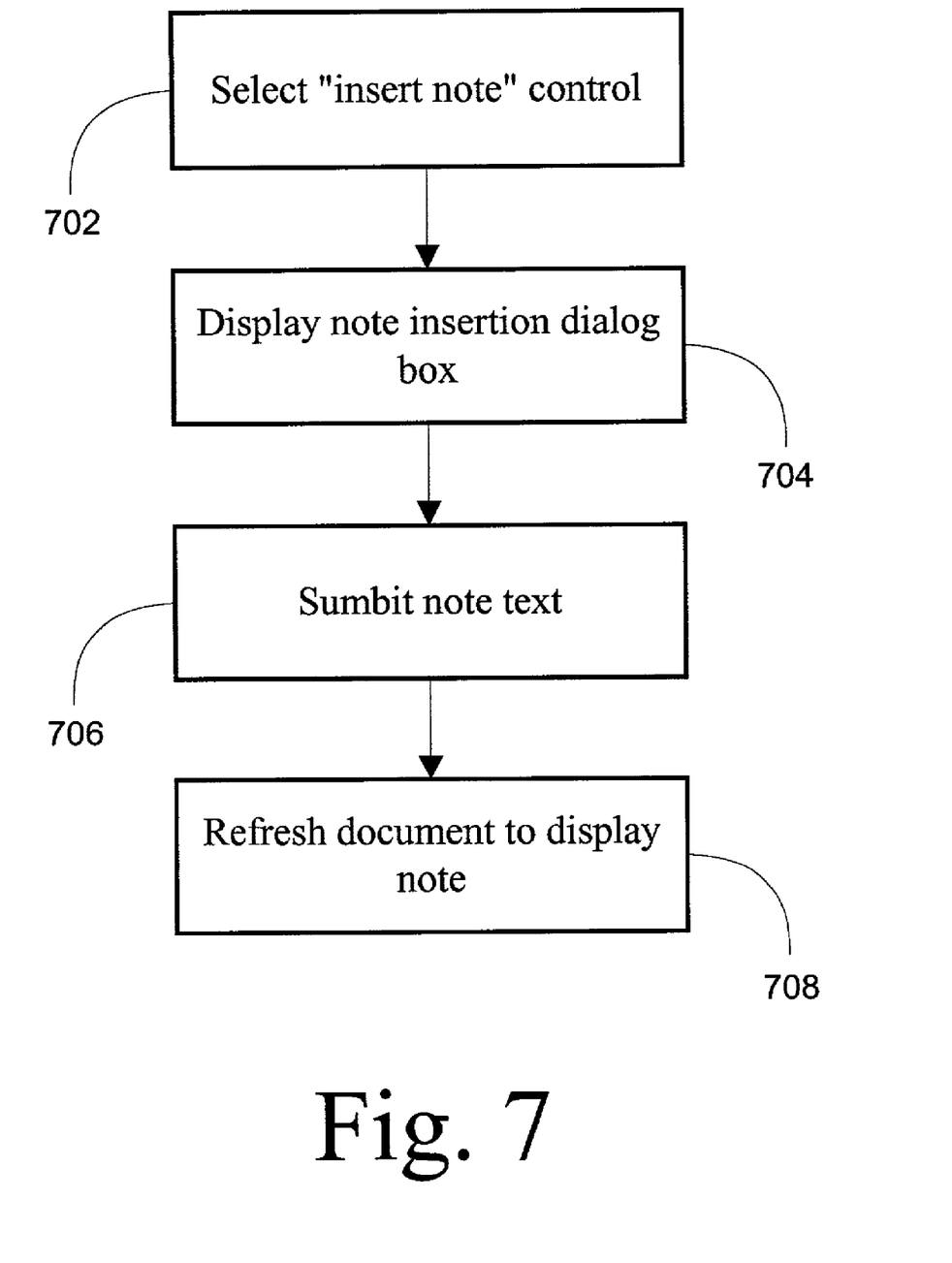
FIG. 7 is a flow diagram presenting a method for inserting a note according to one embodiment of the present invention.

The present invention provides valuable functionality to insert notes into documents; one embodiment of a method for providing such functionality is presented in FIG. 7. When required by a given journal, for example, Science, the author selects a graphical control provided by the citation editor add-in to insert a note, step 702. In response, a note insertion dialog box is presented to the author, 704. The author submits the text of the note into the note insertion dialog box and, when complete, selects a graphical submission control, step 706. The document is refreshed to display the note in the document, step 708. Advantageously, controls are supplied or parameters may be set through which the author may indicate the precise position within the document where the note should appear.

Figure 8:
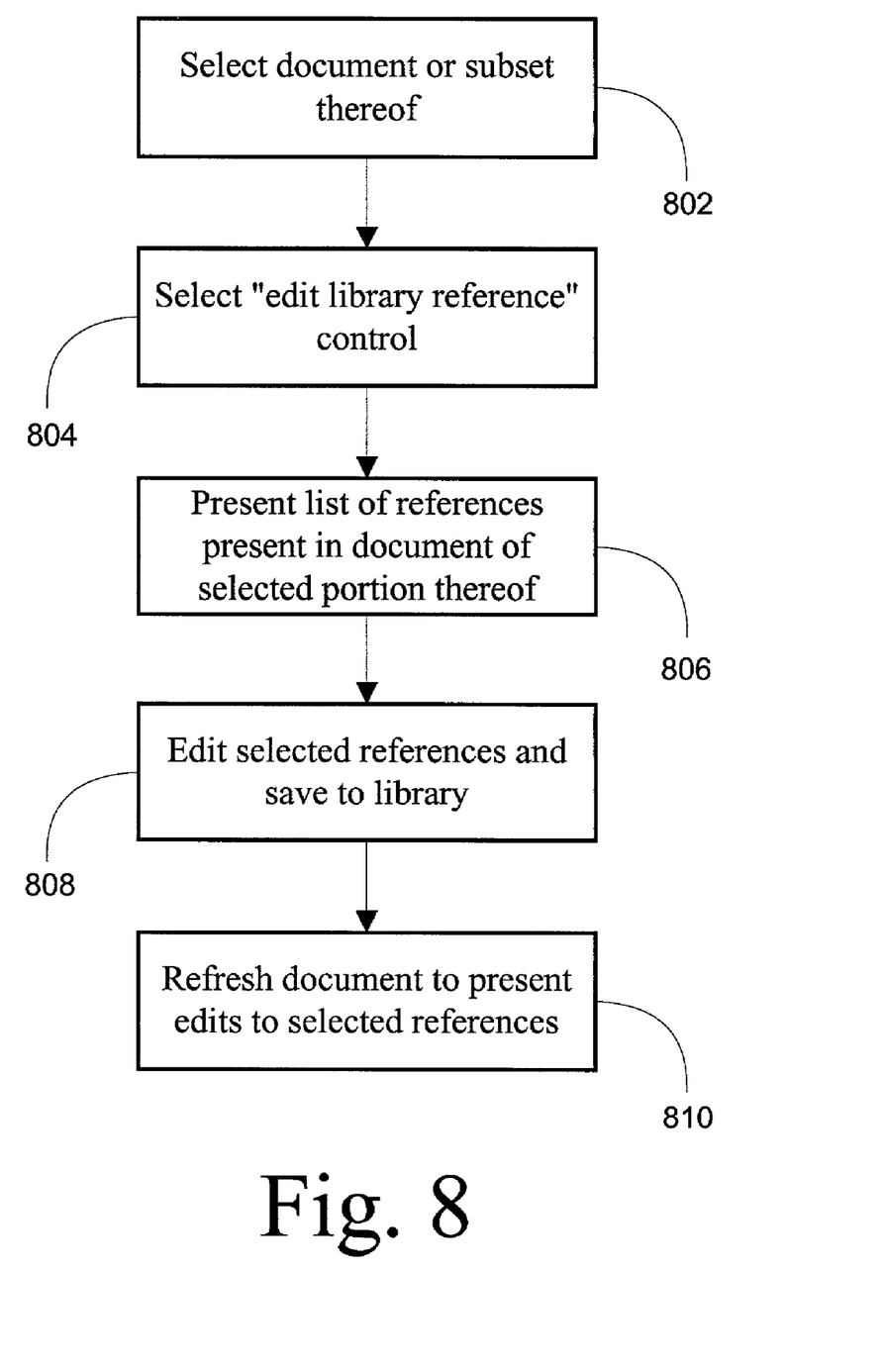
FIG. 8 is a flow diagram presenting a method for editing a library reference according to one embodiment of the present invention.

As previously indicated, an author may elect to use a local citation library in addition, or opposed to, one or more remote libraries. One embodiment of a method for editing references contained in a local citation library is presented in FIG. 8. It should be noted, however, as it is assumed that the author has editing privileges on the local citation library, that the method of FIG. 8 is likewise applicable to remote citation libraries where the author has editing privileges.

In order to edit a reference, the author must select a document or subset thereof, step 802. The minimum acceptable subset of the document is an individual citation. Using graphical controls supplied by the citation editor add-in, the author selects a control to edit the selected references, step 804. Citation data, e.g., information comprising a reference, for each of the citations present in the selected document or portion thereof is presented to the user, step 806. According to one embodiment, the data is presented in a list format.

Using the graphical interface, the author selects references and makes the required edits, step 808. The author may sequentially edit multiple references. The completed edits are saved to the citation library, which may be local or remote, so long as the author has editing privileges on the citation library. The document is refreshed to present changes to the citations contained therein based on the edits made to the underlying references, step 810.

Figure 9:
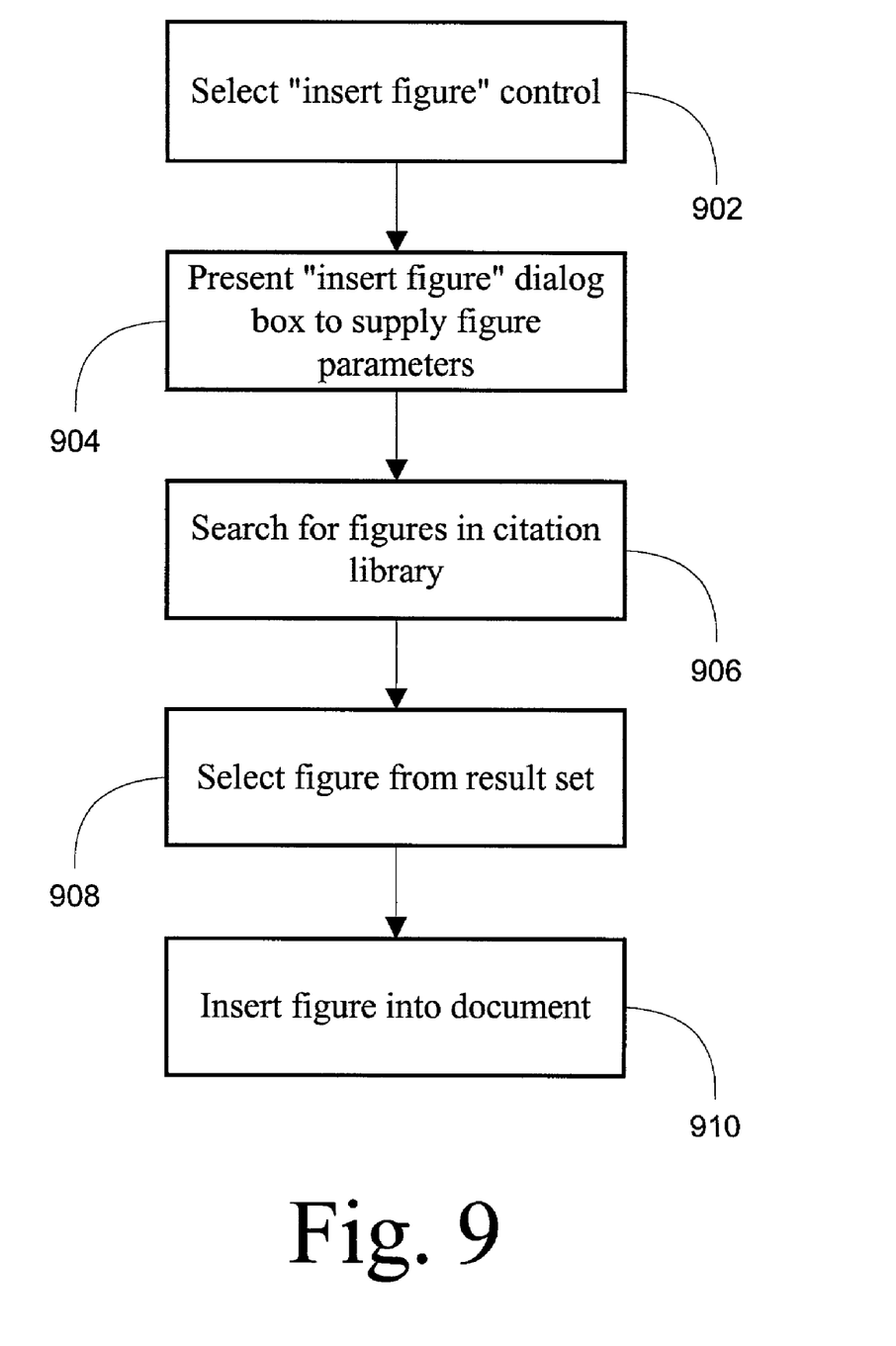
FIG. 9 is a flow diagram presenting a method for inserting a chart or diagram from publication into a document according to one embodiment of the present invention.

Turning to FIG. 9, a process is presented that allows an author to insert a graphic from a publication, such as a chart or diagram, into a document. Using the graphical interface provided by the citation editor add-in, the author selects a graphical control to insert a figure or diagram from a publication into the document, step 902. In response to the selection of the control, the citation editor add-in presents an insert figure dialog box, step 904. Using the graphical controls presented via the dialog box, the author enters one or more parameters identifying the desired figure. For example, the author may supply a publication, an author, an article title, publication date, or other data that may uniquely identify the desired figure.

Using the data regarding the desired figure that is supplied by the author, a figure query is prepared that is used to search one or more citation libraries for the desired figure, step 906. A result set comprising figures contained within the citation databases that fall within the scope of the figure query is presented to the user, step 908. Using an input device, the author selects that appropriate figure from the list of presented figures. The selected figure is inserted into the document and presented to the author, step 910. Alternatively, the figure parameters may be supplied as a temporary citation and automatically formatted according to the process presented in FIG. 2.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A computer-based method for processing one or more citations within a document, the method comprising:
    scanning a document to identify an unformatted citation;
    parsing the unformatted citation to determine one or more citation terms;
    querying one or more citation libraries to find possible citations, each possible citation comprising at least a portion of the one or more citation terms;
    selecting one of the possible citations; and
    inserting a formatted citation based on the selected one of the possible citations into the document.

2. The method of claim 1 wherein scanning is executed periodically.

3. The method of claim 1 wherein scanning is executed when an idle state is identified.

4. The method of claim 1 comprising embedding into the document a traveling library comprising citation data that forms the formatted citation inserted into the document.

5. The method of claim 1 wherein inserting comprises inserting links to citation data that forms the formatted citation.

6. A computer-based system for processing one or more citations within a document, the system comprising:
    citation editor software to identify an unformatted citation within a document; and
    a citation application to receive the unformatted citation, identify a citation that matches the unformatted citation in a citation library storing multiple citations, and pass information based on the matching citation to the citation editor software for enabling the citation editor software to insert a formatted citation into the document.

7. The system of claim 6 wherein the citation editor software identifies the unformatted citation on a periodic basis.

8. The system of 6 wherein the citation editor software identifies the unformatted citation when an idle state is identified.

9. The system of 6 comprising a shared library to convert data from a first format to a second format.

10. The system of 9 wherein the first format is a native format of the citation editor software and the second format is a native format of the citation application.

11. The system of claim 6 comprising a traveling library containing citation data that forms the formatted citation, which is embedded into the document.

12. The system of claim 6 wherein links are inserted into the document linking to citation data that forms the formatted citation.

13. The method of claim 1, wherein the scanning includes parsing the document for citation delimiters to identify the unformatted citation.

14. The method of claim 1, wherein the parsing includes parsing for citation term delimiters to determine the one or more citation terms.

15. The method of claim 1, further comprising
    enabling a user to set format preferences; and
    using the format preferences to generate the formatted citation from the selected possible citation.

16. The system of claim 6, wherein the citation editor software parses the document for citation delimiters to identify the unformatted citation.

17. The system of claim 6, wherein the citation application parses for citation term delimiters to determine one or more citation terms, and compares the one or more citation terms to the multiple citations in the citation library to identify whether any of the multiple citations in the citation library matches the unformatted citation.

18. The system of claim 6, wherein the citation editor software enables the user to set format preferences, and uses the format preferences to generate the formatted citation from the information received from the citation application.

* * * * *